US005468088A

United States Patent [19]
Shoemaker et al.

[11] Patent Number: 5,468,088
[45] Date of Patent: Nov. 21, 1995

[54] FEEDBACK CONTROL OF GROUNDWATER REMEDIATION

[75] Inventors: Christine A. Shoemaker; Gregory J. Whiffen, both of Ithaca, N.Y.

[73] Assignee: Cornell Research Foundation, Inc., Ithaca, N.Y.

[21] Appl. No.: 175,815

[22] Filed: Dec. 30, 1993

[51] Int. Cl.$^6$ ................................. B09B 3/00; E03B 3/12
[52] U.S. Cl. ..................... 405/52; 210/747; 405/128
[58] Field of Search ............................ 405/36, 52, 128, 405/129; 210/170, 747

[56] References Cited

U.S. PATENT DOCUMENTS

| | | | |
|---|---|---|---|
| 4,755,304 | 7/1988 | Hallberg et al. | 210/747 |
| 5,348,420 | 9/1994 | Bernhardt | 405/52 |
| 5,380,126 | 1/1995 | Bernhardt | 405/128 |
| 5,383,747 | 1/1995 | Millan | 405/128 |
| 5,387,057 | 2/1995 | DeLoach | 405/52 X |

*Primary Examiner*—David H. Corbin
*Attorney, Agent, or Firm*—Salzman & Levy

[57] ABSTRACT

The present invention features a differential dynamic programming (DDP) method for computing optimal, time-varying pumping policies utilized in groundwater remediation. The strategy for treating the groundwater can use a feedback law generated by a constrained differential dynamic programming algorithm with penalty functions. The method has been tested in cases where there is uncertainty in the hydraulic conductivity. Confined transient aquifer flow and transport were modeled, using a two-dimensional Galerkin finite element scheme with implicit time differencing. Optimal policies were calculated using a given or "measured" set of hydraulic conductivities and initial conditions. The optimal policies were applied using the same finite element model with a second, or "true" set of conductivities The "true" sets of conductivities were generated randomly from an autocorrelated lognormal distribution by the spectral method. The approach used had an advantage over other uncertainty approaches, because it was not necessary to specify precisely the probability distribution of each uncertain parameter. The method did not require any single probability distribution for each uncertain parameter. The relative weight assigned each penalty function was adjusted, which resulted in obtaining robust feedback laws that performed equally well under different, assumed error distributions. The water remediation method of this invention resulted in a cost savings within the approximate range of between 4% and 51% less than the cost of applying the calculated optimal policies without using a feedback law.

12 Claims, 2 Drawing Sheets

FEEDBACK CONTROL OF GROUNDWATER REMEDIATION

FIELD OF THE INVENTION

The research for this invention was funded in part by a grant from the National Science Foundation (ASC 8915326) to Christine A. Shoemaker. Primary support for Gregory J. Whiffen was in the form of a fellowship award by the Department of Energy Computational Science Graduate Fellowship Program. The U.S. government has certain rights in this invention.

The present invention pertains to a method of groundwater remediation and, more particularly, to a groundwater remediation method utilizing differential dynamic programming (DDP) for computing optimal, time-varying pumping policies.

BACKGROUND OF THE INVENTION

In every state of this country and throughout the world, underground aquifers and other subterranean groundwaters have been contaminated. The procedures utilized to clean up these water resources are expensive; hence, it has become necessary to optimize the methods by which these natural resources can be made purer.

The current invention entails a method of pumping the contaminants out of the underground waters. The method has developed an optimized procedure that performs well, even when substantial uncertainty exists regarding aquifer characteristics.

The invention uses a "weighted feedback" law that adjusts pumping rates of extraction wells, when the observed values of hydraulic head and pollution concentration deviate from the predicted values over time.

Several approaches have been proposed in the prior art to preserve the value of optimization analysis, when there is significant error in the aquifer model, i.e., changes over time. One such method[21] is a chance-constrained technique for finding constant pumping policies to remediate contaminated aquifers. The method used the inverse problem via nonlinear multiple regression to obtain parameter estimates and to estimate the covariance matrix for the uncertain flow and transport parameters. These values were used in a chance-constrained algorithm, using first-order first- and second-moment analysis to obtain an optimal strategy with an estimate of the probability that the aquifer will be cleaned. This method does not allow for the use of new information obtained during the remediation to alter the policy. The policy is completely determined before the remediation even begins.

Another method[20] presents a neural network technique for identifying the most pessimistic or constrained realizations of hydraulic conductivity values in a set generated randomly for use in a chance-constrained optimization. The procedure employs hydraulic gradient control strategies for contaminant capture. This method is tested to identify pessimistic realizations for a linear programming optimization model of gradient control for a two-dimensional aquifer. This approach can allow large sets of conductivity realizations to be used in chance-constrained methods, because nonconstraining conductivity realizations can be screened before the optimization in order to reduce computational complexity.

This neural network screening method[19] has further been applied to a mixed integer chance-constrained programming model for hydraulic gradient control. For this newer technique, it is crucial to reduce the number of constraints corresponding to conductivity realizations, because the computational effort needed to solve the problem grows geometrically with the number of constraints.

Another proposed method[4] reduces parameter uncertainty as a function of future measurements, remediating the contaminated aquifer in a cost-effective manner. The optimization problem is resolved each time new parameter estimates are obtained. This method is compared to an unweighted feedback law generated by differential dynamic programming, neglecting second derivatives of the transition function and using the active constraint method. The method has been tested on a 20-node, one-dimensional aquifer. It does not incorporate inequality constraints. This method has been applied to a two-dimensional aquifer; the approach has been extended to include more general constraints. A feedback law using the penalty function method or second-derivative information from the transition equation has not been used, however, with this technique.

A further method[22] uses what is called a stochastic programming technique, with recourse to calculate optimal steady-state pumping policies for gradient contaminant containment. The cost of plume escape or recourse cost is included in this objective. Four model formulations were solved, using a linear finite difference approximation for the steady-state flow equations. The stochastic programming approach finds the least-cost policy constrained to contain the modeled pollution plume, using both the best-guess parameter values and a specified set of different realizations of the uncertain parameters. Violation of the containment constraints is possible, if recourse costs are included. Recourse costs are the costs associated with the escape of the plume from the containment region; they include fines and the costs associated with drilling new wells. Policies calculated by these methods will satisfy the containment constraint over a wide range of conditions (typically, by pumping a great deal).

The inventive method herein represents a different approach to incorporating uncertainty than has been utilized in most earlier approaches. The feedback procedure developed by the current inventors uses input probability distributions for uncertain parameters in a different way than do way other, former approaches. Frequently, information is inadequate to reliably determine probability distributions. Feedback laws can be tested using a range of probability distributions. In particular, feedback laws can be developed and tested without the assumption that the analyst can assign relative probabilities to each set of randomly generated parameters. This property allows the analyst to develop feedback policies which are robust, with respect to assumed probability distributions used to characterize model uncertainty and error.

Another way to view this property is to recognize that feedback policies developed by the weighted feedback approach are more sensitive to measurements taken during the remediation than they are to assumed distributions. This relieves the analyst of the task of producing an "accurate" probability distribution.

Unlike some earlier approaches, the inventive feedback policies use information during the remediation as it becomes available; the policies are not assumed to be completely determined before the remediation begins (as in earlier methods[21]).

Unlike the foregoing procedure[4] that reduces parameter uncertainty as a function of future measurements, the invention takes into account feedback laws generated by the penalty function method, coupled with differential dynamic programming as the basis of a nonlinear feedback law. Feedback laws generated in this way are sensitive to all constraints.

SUMMARY OF THE INVENTION

In accordance with the present invention, there is provided a differential dynamic programming (DDP) method for computing optimal, time-varying pumping policies utilized in groundwater remediation. The strategy for treating the groundwater uses a feedback law generated by a constrained differential dynamic programming algorithm having penalty functions. The method has been tested in cases where there is uncertainty in the hydraulic conductivity. Confined transient aquifer flow and transport were modeled, using a two-dimensional Galerkin finite element scheme with implicit time differencing. Optimal policies were calculated using a given or "measured" set of hydraulic conductivities and initial conditions. The optimal policies were applied using the same finite element model with a second, or "true" set of conductivities. The "true" sets of conductivities were generated randomly from an autocorrelated lognormal distribution by the spectral method. The approach used had an advantage over other uncertainty approaches, because it was not necessary to specify precisely which parameters were considered uncertain and which were certain. The method did not require any single probability distribution for each uncertain parameter. The relative weight assigned each penalty function was adjusted, which resulted in obtaining robust feedback laws that performed equally well under different, assumed error distributions. The water remediation method of this invention resulted in a cost savings within the approximate range of between 4% and 51% less than the cost of applying the calculated optimal policies without using a feedback law.

The pump-and-treat method of this invention can be summarized as follows. First, based on the measured or inferred pollution distribution and the flow characteristics of the site, well locations are chosen for withdrawal. Secondly contaminated water is withdrawn until adsorbed, and dissolved pollutant concentrations reach some pre-assigned, safe level. Thirdly, while withdrawing the water, the withdrawn water is treated and discharged to the surface water.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, groundwater contamination is recognized as a widespread and serious threat to drinking water sources in this and many other countries. Contaminated aquifers have been identified in every state of the United States. The rate of discovery of new, polluted sites is increasing[16]. It is estimated that between 1% and 2% of all usable, near-surface groundwater in the United States is contaminated by point sources alone. The cost of a single remediation can range from several thousand to over a billion dollars.

The prevalence of groundwater contamination and the high costs associated with remediation by pump-and-treat methods have led many researchers to use a variety of remediation strategies. More recently, optimization methods have been utilized as a means to cut costs. Linear, nonlinear and neural network optimization techniques are quite common[2,10,19]. One combinatorial remediation optimization problem has been solved by using simulated annealing[8,10].

Transport models for groundwater are nonlinear in nature; therefore, nonlinear optimization methods offer a more accurate tool, when computationally practical.

Nonlinear optimization methods rely upon associated predictions of their flow and transport. Accurate modeling of any aquifer can be very difficult or impossible; therefore, calculations attempting to optimize clean-up procedures that are based on deterministic models of flow and transport will not, in fact, be optimal for real aquifer systems. There is concern that such optimization analyses may fail to meet clean-up goals.

The optimization method of this invention is a continuation of previous analyses performed at Cornell University on deterministic groundwater remediation[5].

The method comprises techniques for computing time-varying, optimal pumping policies, using a modified version of the optimal control algorithm differential dynamic programming[6]. The method described herein can be used in conjunction with the management period and the quasi-Newton approach. The technique of management periods is one in which the user chooses the number of finite element time steps to incorporate into each "management" period of the optimization. This approach reduces the computational requirements and generates pumping policies that are more practical to implement, because the pumping rates are not allowed to change too frequently. Quasi-Newton approximated second derivatives of the transition function can be used to reduce the number of iterations required for convergence and to calculate the overall computation time.

Prior art includes the use of unweighted feedback for constrained optimal control problems[11]. The current invention, however, has developed a new, weighted feedback approach for constrained optimal control problems. The new procedure adjusts penalty function weights to obtain a robust feedback policy for constrained optimal control problems.

Feedback Control and its Application to Uncertain Systems

Feedback policies respond to uncertainty by modifying the pumping policy in each time period, based upon the measurements of groundwater heads and pollution concentrations at the start of the same time period. Feedback policies typically consist of two parts. First, in the pump-and-treat case, there is a specified, optimal pumping schedule based on the best-estimate parameter values used with the flow and transport simulation model. Second, a feedback law is specified that will indicate how the optimal pumping policy should be altered, in the event that, during remediation, the observed state of the system differs from the predicted state thereof. In this sense, feedback laws can respond to all types of modeling errors, without requiring the specification of which parameters are to be considered uncertain.

Feedback laws differ from inverse modeling updates, in that no improved set of parameters is generated for remodeling the system. Feedback laws directly respond to the observed deviations by changing pumping rates. For example, if a certain region seems to have both a higher-than-predicted pollution concentration level and hydraulic head after a portion of the remediation, then a feedback law may respond to this information by increasing the pumping rate or shifting the pumping rates spatially among active wells. Feedback can be combined with inverse methods, as well as with reoptimization.

The feedback laws considered in this invention respond to model error by changing the pumping schedule during the remediation, whenever observed measurements of hydraulic head or pollution concentration conflict with the model predictions. Differential dynamic programming generates a feedback law, whereas nonlinear programming algorithms do not. For systems with nonlinear transition equations (such as contaminant transport), coupled with parameter uncertainty, there is no guarantee that the differential dynamic programming feedback law is optimal. However, the numerical results obtained by this invention indicate that the algorithm can be used to produce weighted feedback laws which outperform policies without feedback, under a range of uncertainty conditions.

Optimal time-varying pumping rates for the deterministic problem can be computed by an optimization method. In the numerical example given here, a modification of the DDP algorithm was used. In order to distinguish this algorithm from the true DDP algorithm, the prior method upon which this invention is based used the term "successive approximation linearized dynamics quadratic regulator" or SALQR, to define the modified DDP algorithm. This modified DDP algorithm neglects second derivatives of the transition function "T" but still uses a quadratic approximation to the objective (regulator) function, when calculating a new search direction.

Once optimal, time-varying pumping rates for the deterministic case are found, DDP is used with the second derivatives of the transition function and the penalty function method for constraints to generate feedback laws.

A method[4,12] of the prior art uses a feedback law that is based on SALQR (i.e., it sets second derivatives of the transition equation equal to zero) and the active set (rather than a penalty function) technique for constraints. (The use of deterministic feedback has not been a major focus of this method, and nonlinear feedback has not otherwise been discussed in the groundwater contamination literature.)

The invention demonstrates the advantage of complete second derivative information for the formulation of linear feedback laws. The method also modifies the penalty function-DDP-generated, weighted feedback laws to ensure that all control or pumping constraints are met at each time step during the application of the feedback law.

The introduction of penalty functions to convert the groundwater remediation-constrained optimal control problem to an unconstrained optimal control problem allows flexibility in designing the response of feedback laws to violations in constraints. For instance, heavily weighting a penalty function will cause the feedback law generated by DDP to react strongly to any information that the constraint corresponding to this penalty function will be violated. In the pump-and-treat case, feedback may greatly increase the pumping rates near an observation well, whenever the pollution concentrations of the extracted water therefrom exceed the predicted concentrations by the flow and transport model in use.

Another advantage to using the feedback approach is efficiency. Rather than simply generating robust, open-loop policies which work well under a wide variety of conditions, feedback laws respond to site data on heads and pollutant concentrations as they become available. Feedback laws can take advantage of situations where the real aquifer can be cleaned with less effort than that predicted.

Optimal control with Feedback for Groundwater Remediation

The pump-and-treat method of this invention can be summarized as follows:

First, based on the measured or inferred pollution distribution and the flow characteristics of the site, well locations are chosen for withdrawal.

Second, contaminated water is withdrawn until adsorbed, and dissolved pollutant concentrations reach some preassigned, safe level.

Third, while withdrawing the water, the withdrawn water is treated and discharged to the surface water.

Design variables that can be optimized include well location; pumping rates as a function of time; and treatment facility flow rate capacity. Typical design constraints include a maximum allowable total extraction rate to reflect limitations in treatment facility capacity, safe drinking standards, and limitations on individual pumping rates to avoid pumping wells dry. Costs include treatment costs, energy costs to run the pumps and the maintenance of the systems. The cost (or one index thereof) is minimized, subject to the constraint that the aquifer contamination meet specified tolerances by the end of the remediation.

Optimal Control Formulation

Optimal policies were calculated using SALQR to solve the following constrained optimal control problem:

$$J = \min_{u_t} \sum_{t=1}^{N} g^t(x_t, u_t) \quad (1)$$

where:

$x_t$ is a state vector of dimension n containing the head and concentration at each active node of the finite element mesh at time step t, $U_t$ is a control vector of dimension m containing the pumping rates at each potential remediation well at time t, and $g^t(x_t, u_t)$ is the cost incurred at time t due to state $x_t$ and control $u_t$. The total number of decision time periods is N.

The cost function can be any nonlinear, twice-differentiable function of $x_t$ and $u_t$. The minimization is constrained by the finite element model's prediction of the state of the aquifer at a future time step, given the control and state at the current time step:

Transition function $$x_{t+1} = T^t(x_t, u_t) \quad t=(1, 2, \ldots, N-1) \quad (2)$$

where: the function T is composed of matrices generated by the finite element model for each time step t. The initial state of the aquifer before any remediation is as follows:

Initial condition $$x_{t=1} = x_0. \qquad (3)$$

Further constraints were added to ensure that only extraction is allowed at each withdrawal site (this is optional); to ensure that total pumping at each time step does not exceed waste removal treatment capacity $U_{max}$, and to ensure that a water quality standard $C_{standard}$ is met at all observation wells by the final time step, t=N:

Extraction only $$u_t \leq 0 \, t=(1, 2, \ldots, N) \qquad (4)$$

Treatment capacity $$-\Sigma \text{wells } i \, u_t(i) \leq U_{max} \, t(1, 2, \ldots, N) \qquad (5)$$

Drinking standard $$c(x_{t=N}) \leq C_{standard} \, t=N \qquad (6)$$

The function $c(x_{t=N})$ returns the concentrations at each observation well at the final time step, N. The constrained optimal control problem, (1)–(6), can be approximated by an unconstrained optimal control problem by introducing a penalty function into the objective function, $$J' = \min_{u_t} \sum_{t=1}^{N} \left[ g^t(x_t, u_t) + \sum_{j \in \{r_t\}} Y_j^t(x_t, u_t, w_j) \right] \qquad (7)$$

$$x_{t+1} = T^t(x_t, u_t) \, t = (1, 2, \ldots, N-1), \qquad (8)$$

$$x_{t=1} = x_0 \qquad (9)$$

where: $Y_j^t$ is the penalty assessed for a violation of constraint j in time step t, $(r_t)$ is the set of constraints from (4)–(6) that are in effect at time step t, and $w_j$ is the weighting or strength assigned to the jth constraint. The penalty functions, $Y_j$, in (7) do not approximate physical or economic penalties for constraint violation. In this equation, they are introduced as a numerical construct to solve the original constrained optimal control problem, (1)–(6). The solution of the constrained problem, (1)–(6), can be obtained to arbitrary precision by solving the penalty function formulation, (7)–(9), by letting $w_j$ become arbitrarily large as the algorithm converges. In practice, $w_j$ is increased, and the problem is re-solved until there is no numerically significant change in the optimal policy with increasing $w_j$. Constraint violations are typically made to be less than 0.001% Solution of (7), (8) and (9) using SALQR requires first and second derivatives of g and Y, and first derivatives of T with respect to the control variables $u_t$ and the state variables $X_t$.

The form of the penalty function used in the numerical examples is the same as in the previous method[5] upon which this invention is based:

$$Y_j(f_j(x_t,u_t), w_j) = \xi_j \, \xi_j \geq \xi_0 \, Y_j(f_j(x_t, u_t), w_j) = a(\xi_j)^n + b(\xi_j)^m + c \, \xi_j \geq \xi_0 \, (10)$$

where:

$$\xi_j = (w_j^2 f_j^2 + \epsilon_j^2)^{1/2} + w_j f_j. \qquad (11)$$

The parameter $\epsilon_j$ is a shape parameter of the hyperbolic function $\xi_j$. The function $f_j(x_t, u_t)$ is the jth constraint of the constraint vector where the constraints (4)–(6) are written in the form $f_j(x_t, u_t) \leq 0$. Hence, $f_j(x_t, u_t)$ is the right-hand side of each constraint equation, (4)–(6), minus the left-hand side, where j ranges over all constraints to be enforced at time t.

The constants a, b and c are chosen so that $Y_j$, $\delta Y_j/\delta \xi_j$ and $\delta^2 Y_j/\delta \xi_j^2$ are continuous at $\xi_j = \xi_0$. In particular, the values $\xi_0 1$, n=2, and m=½ were used, which leads to a=⅓, b=⅓, and c=-⅔.

The cost function $g^t(x_t, u_t)$ used in the numerical examples is also the same as that used in the prior method[5,6]:

$$g^t(x_t, u_t) = \Sigma i \in \Omega \, a_1 u_{t,i} + \Sigma i \in \Omega \, a_2 u_{t,i}(h_* - h_{t+1,i}) \qquad (12)$$

for constants $a_1$ and $a_2$. In (12), the first term on the right-hand side represents water treatment cost, and the second term reflects the pumping cost. The operation cost at each well is assumed to be the product of the extraction rates $u_t$ and the lift $(h_{*=l} - h_{t+1,i})$. The summations in (12) are over the set of all possible pumping sites $\Omega$. It is important to note that many other forms of the objective function and penalty function can be used. All that is required of the cost function $g^t$, and the penalty functions, $Y_j^t$, is that they are each twice continuously differentiable in both $x_t$ and $u_t$. The values of $a_1$ and $a_2$ were chosen to be 10.0 and 1.0, respectively. These are hypothetical values to demonstrate the technique.

Differential Dynamic Feedback Laws

Once optimal policies are established for estimated parameter values, feedback laws can be generated using the optimal solution. Unlike nonlinear programming, DDP generates a feedback law during each iteration and uses this feedback law to establish an improved policy. The feedback law generated by DDP will always result in the optimal policy when applied, if the system dynamics are linear and the objective to be minimized is quadratic in x and u[11]. The form of the feedback law generated by DDP (see Appendix A) is:

$$u_t^{act} - \bar{u}_t = \delta u_t = \beta_t \delta x_t + \alpha_t. \qquad (13)$$

The term $u_t^{act}$ is the policy that is implemented under feedback and $\bar{u}_t$ is the optimal policy. The term $\delta x_t = x_t - \bar{x}_t$ is the vector difference between the current observed state $x_t$, after applying (13) from time step 1 to t−1, and the predicted state $\bar{x}_t$. The term $\beta_t$ is an m x n matrix and $\alpha_t$ is an m vector, both of which are functions of the first and second derivatives of $T^{t'}$, $g^{t'}$, and $y^{t'}$ with respect to $x_t$, and $u_t$, where t' $\in$ {t, t+1, ..., N). For a detailed description of the DDP-SALQR algorithm, including the calculation of $\beta_t$ and $\alpha_t$ appearing in (13), see Appendix A. Motivation and derivation of $\beta_t$ and $\alpha_t$ can be found in the literature[11,23].

If we apply the optimal policy and a corresponding feedback law to a deterministic simulation, based on the same parameters as used to generate the optimal policy, then we expect any reasonable feedback law will not alter the optimal policy (i.e., $u_t = \bar{u}_t$, ∀t). In other words, the feedback law (13) should not alter the optimal policy when there is no error in the prediction of the system, $\delta x_t = 0$. This is the reason that any feedback law produced near an optimal deterministic solution by DDP will have a negligible $\alpha_t$. When the DDP algorithm converges to a solution, the vectors $\alpha_t$ in (13), which are proportional to the gradient, vanish. Thus, the form of DDP feedback applied when there is uncertainty is $\delta u_t = \beta_t \delta x_t$ with no constant term $\alpha_t$.

Differences between Feedback Laws from DDP and Mixed First-and Second-Order Methods When T is represented by an implicit time-finite element model, the degradation in the improvement per iteration of SALQR, compared to DDP, is more than made up for in the savings achieved by not calculating the second derivatives of the finite element model (an $O(n^4)$ calculation, where n is the number of finite element nodes). The discovery of this is found in the prior art[5]. It is for this reason that SALQR was used to find the optimal policies for the numerical example.

However, it is reasonable to compute feedback laws using the full, second-order formulation of DDP (without approximation) for the generation of $\beta_t$, once an optimal policy is known, even if the iterative process used to calculate the optimal policy uses only first derivatives of the transition in the manner of SALQR or quasi-Newton approximations. Although the calculation of second derivatives of an implicit time-finite element model is expensive, these derivatives need only be calculated once for the generation of a feedback law, unlike the iterative process which DDP requires to find an optimal policy in the first place. Theoretically, feedback laws generated using the full, second-derivative formulation should be more effective, because they incorporate more complete information about the system dynamics described by the transition function. In fact, second-order information is just as necessary in the formulation of a linear feedback law as is first-order information. The curvatures of the transition function T, the objective g, and the penalty functions Y are necessary to define the linear coefficient matrices $\beta_t$. We would expect that feedback laws that incorporate the second-order curvature of the transition equation, T (which describes the groundwater physics and chemistry) will perform better. This has been demonstrated in our numerical results.

Penalty Function Method versus Other Methods for Feedback

The matrix $\beta_t$ and the vector $\alpha_t$ in the feedback law (13) depend on the penalty functions $Y_i$ and the weights $w_i$ as described in detail in Appendix A, (19)–(27). Hence, the feedback law generated here differs from feedback laws generated using SALQR and the prior active constraint method[4,12]. Feedback laws generated by the active constraint set method coupled to DDP are not sensitive to constraints other than those which are "active" or constraining at the optimal solution. Hence, active set feedback laws will not work to prevent violation of inactive constraints, given system uncertainty. The numerical results of this invention indicate that inactive constraints are often violated by a linear DDP feedback law, when there is significant model set method coupled to DDP are not sensitive to constraints error (see the unmodified feedback columns of Table 2 below), which supports the use of penalty methods, rather than active set methods. By varying penalty functions, weights, and modifying the final form of the feedback law, it is possible to produce "weighted" feedback laws that will likely avoid constraint violations.

NUMERICAL ISSUES IN APPLYING WEIGHTED DDP FEEDBACK

Four issues must be addressed whenever weighted feedback analysis is applied. First, it must be understood that the influence of weights on feedback laws affects the selection of candidate weights. Second, a criterion must be established to compare the performance of feedback laws. Third, measurement error and uncertainty must be modeled for feedback testing. Fourth, a modification must be made to DDP feedback to ensure that all control (pumping) constraints are satisfied. These issues are addressed hereinbelow.

Influence of Constraint Weightings on Feedback Laws

A family of weighted feedback laws can be generated by set method coupled to DDP are not sensitive to constraints changing the constraint weightings $w_j$ appearing in (7), and using one iteration of the DDP algorithm starting with an set method coupled to DDP are not sensitive to constraints optimal policy to calculate the resulting $\beta_t$. The matrices set method coupled to DDP are not sensitive to constraints $\beta_t$ along with the optimal policy constitute feedback policy (13), which can be used in cases where there is uncertainty in the validity of the flow and transport model.

Adjustment of the weightings $w_i$ has a simple, intuitive meaning with respect to the feedback laws generated. As an example, suppose it is very important that a particular water quality constraint be satisfied in the last time step. If a feedback law is generated using a large weight $w_j$ on that constraint, then the feedback law will react strongly to any observed information during the remediation which it considers threatening to the satisfaction of the water quality constraint. Typically, the change in the policy, $\delta u$ in (13), will be an increase in the pumping rates and/or a shifting of pumping to the offending region.

Testing and Selecting Feedback Laws

In general, the selection of a performance criterion for comparing feedback laws will help dictate the appropriate simplifications that should be made when searching the weighting parameter space. For example, if it is particularly important that certain individual constraints are satisfied (such as one particular observation well must satisfy the drinking standard with very high probability), then the weighting associated with this constraint should be explored individually.

Once a criterion is established for performance, feedback laws can be tested using simulations based on parameters and boundary conditions with the range of errors anticipated for the site in question. A systematic exploration of the weighting parameter space $w_j$ can be carried out to find feedback policies which perform well. Unlike some stochastic programming optimization methods, the computational effort grows only linearly with the number of realizations used to test the feedback policy.

For the inventive method, a comparison of performance based on a single performance index is utilized. A performance index for the groundwater remediation problem should depend strongly on any violation of the drinking standard constraint, (6); it should also reflect the operating cost of the feedback policy. For these reasons the unconstrained objective function, $$P(u) \equiv \sum_{t=1}^{N} \left[ g^t(x_t, u_t) + \sum_{j=1}^{r_t} Y_j^t(x_t, u_t, \overline{w_j}) \right], \quad (14)$$

(where $\overline{w_j}$ was chosen and is the same for all comparisons) was used for our performance index. The penalty functions in (14) are used to compare feedback laws. In practice, the fixed weights, $\overline{w_j}$, can be defined to reflect the regulatory environment or to approximate economic penalties. The index P will be large when there is a violation in any of the constraints, (4)–(6), due to the penalty functions $Y_j$. In particular, any violation in the drinking standard will result in a high index value. Violation of the constraints on the control variables (4) and (5) by the feedback policy can be avoided by modifying the feedback policy as discussed below. It is important to note that, for the methodology described, many other more complex indices or criteria can be used. The index need not be smooth or differentiable.

Modeling Uncertainty and Error: Bias and Variance

Model uncertainty can be modeled by generating sets of parameters with random values, so that the random fields exhibit the range of statistical error and systematic error one might encounter at the design site. The performance of different feedback laws can be judged, based on a direct comparison of the average and variance of the performance index.

Two types of errors are considered in the numerical analysis. First considered is the overall systematic error or "bias" such as underestimating or overestimating the conductivity on average. The second consideration is the magnitude of the individual scatter of measured or inferred values at each node of the computational mesh. The magnitude of the scatter, or the "variance", is defined as the variance of the field after subtracting the bias. Variance error represents both undetected spatial variability (uncertainty) and measurement scatter.

Figure 1:
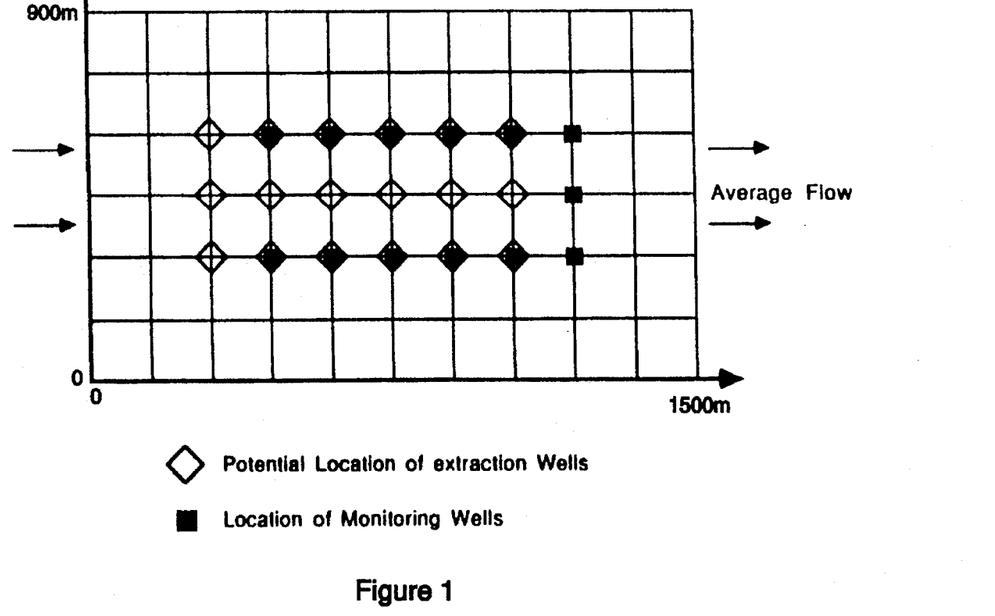
FIG. 1 illustrates an extraction well system that is remediated in accordance with the invention; it is displayed upon a mesh (grid) diagram.

Uncertainty was modeled in the numerical example of this invention by generating 90 nonbiased, inhomogeneous isotropic conductivity fields from a lognormal distribution using the spectral method[15]. A prior art program[9] was used to generate the fields. The correlation structure of the field is of the form:

$$\rho_X(l) = e^{-k|l|} \quad (15)$$

where: X is normally distributed and defined by $$X = \log_{10} K, \quad (16)$$

where: K is the conductivity field. The correlation distance, $l_c = 1/k$, or the distance over which conductivity values are appreciably correlated, was chosen to be 750 m (see FIG. 1).

Thirty fields, out of ninety fields with the same mean, were generated to represent a measurement error and/or uncertainty with standard deviation of five percent (5%) of the field mean. The thirty fields represent a standard deviation of ten percent (10%), and the remaining thirty fields represent a standard deviation of twenty-five percent (25%). Spatial variability is usually much greater than twenty-five percent (25%). For instance, a prior art report[1] presented vertically averaged hydraulic conductivities for the stratified drift aquifers of Connecticut with standard deviations ranging from 89 to 262 feet/d (27.1 to 79.7 m/d), and means from 99 to 244 feet/d (30.2 to 74.4 m/d). These values correspond to normalized deviations ranging from 80% to 140%. However, a value of 25% may be reasonable, with the interpretation that it represents not the whole of the existing spatial variability, but, rather, just the difference between the estimated and actual values. Thus, for the numerical example, consider the spatial variability has been characterized to a precision such that errors are roughly bounded by 25%. It is assumed that all measured spatial variability is used in the calculation of the optimal policy and feedback laws The task of developing feedback laws, given much larger measurement error and uncertainty, must be left for future research.

Three optimal policies were calculated, using homogeneous conductivity fields which represent: (b 1) an overall 10% negative bias or underestimation of the conductivity on average, (2) no bias (which is equivalent to achieving a very good estimate of the average conductivity over the whole modeled region), and (3) an overall 10% positive bias or overestimation of the conductivity values on average. It is assumed for simplicity that measurements indicate homogeneity; it is not necessary to make this assumption for the method. The three sets of thirty conductivity fields in conjunction with the three optimal policies result in nine (3×3=9) different statistical conditions. The nine different statistical conditions of the simulated error, each with effectively thirty (30) realizations, result in a total of 270 combinations. Control Constraints and the Application of Feedback When model errors are large, it is expected that the difference $\delta x_t$ between the predicted state of the system $\overline{x}_t$, and the observed state thereof after application of feedback $x_t$ will be large. Since the feedback law (13) is based on a quadratic approximation around $\overline{x}_t$, the constraints (4), (5) and (6) may be violated in the implementation.

Violation of the control or pumping constraints, (4) and (5), within a time step can be avoided entirely at each step by truncating and/or scaling the feedback policy, $u_t^{act}$, after it is calculated from (13) and before it is applied to the groundwater system or simulation model. Any of a number of schemes will likely be possible for each set of control constraints. It should be pointed out that direct enforcement of state constraints, such as the concentration constraint (6), is not possible.

For our example, the following truncation and scaling was used to ensure that the feedback pumping policy for time step t, $u_t$, satisfies both the extraction-only constraint, $u_t \leq 0$, and the treatment capacity constraint, $-\Sigma_{wells\ i}\ u_t(i) \leq U_{max}$ (equation (5)). First calculate $$\overline{\gamma} = \frac{-U_{max}}{\underset{wells\ i}{\Sigma} \min(\beta_t \delta x_t + \overline{u}_t, 0)_i} \quad (17)$$

Next, $\gamma = \min(\overline{\gamma}, 1)$ is the factor by which each extracting well rate needs to be scaled to ensure that the treatment capacity, $U_{max}$, is not exceeded. Thus, to ensure that both the treatment and extraction-only constraints are satisfied, choose:

$$u_t = \gamma \min(\beta, \delta x_t + \overline{u}_t, 0) \quad (18)$$

Equations (17) and (18) represent a simple, commonsense approach that would be used in any field implementation: Do not pump outside capacity ranges for the pumps or the treatment plant, yet use the relative ratios of the pumping rates prescribed by the feedback law. Equations (13), (17) and (18) define the nonlinear feedback law that is tested herein.

NUMERICAL EXAMPLE

The Aquifer

The feedback law method described was tested on an aquifer modeled by a finite element mesh with 77 nodes and 66 elements covering an area of 900 m by 1500 m. The boundary conditions create a net flow from west to east in FIG. 1 of the computational mesh. All nonconductivity parameter values used for the flow and transport model are the same as those previously adopted[5]. A table indicating parameter values for the simulations is given in Appendix B. The optimization was allowed to consider 18 possible pumping sites, indicated by open diamonds on the computational mesh in FIG. 1. The optimizations were constrained to require that a water quality standard of 0.5 μg/L be achieved at 13 water quality monitoring wells, indicated by solid squares, by the end of the 5-year remediation horizon. Treatment facility maximum flow rate, $U_{max}$, was chosen to be 0.04 m³/s. In all cases, an initial pollution plume was used, with a peak pollution concentration of 40 μg/L representing a diffused point source release.

Figure 2:
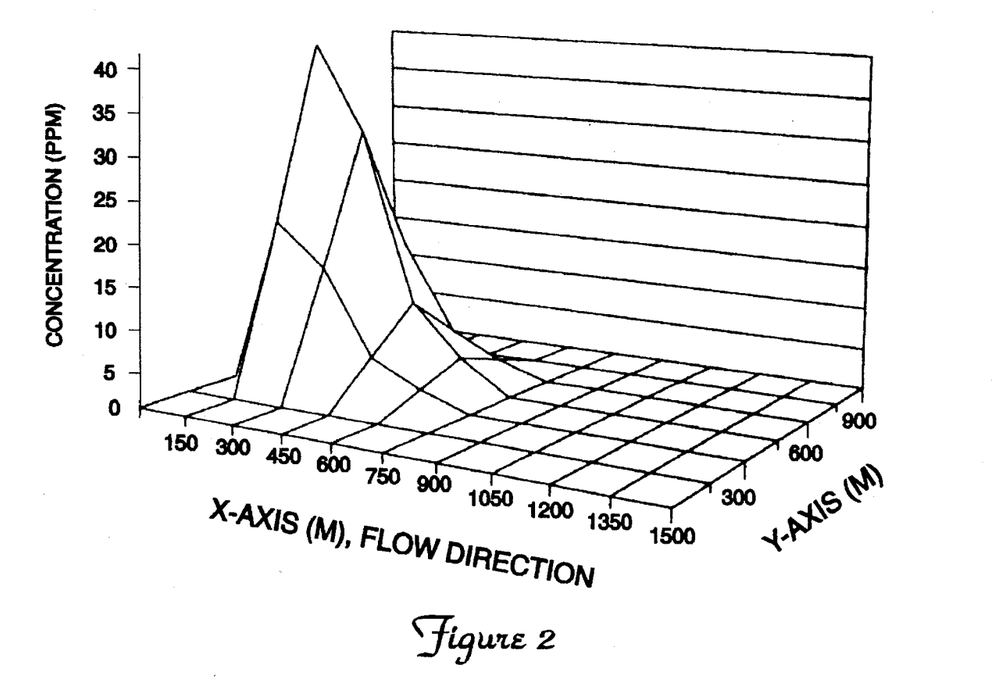
FIG. 2 depicts a three-dimensional graph of a pollution concentration distribution.

Referring to FIG. 2, a graph is illustrated of the initial pollution distribution at time zero. The optimization of pumping rates was allowed to consider changing the pumping rate at each well every three months or twenty times over the entire five-year remediation. The solved problem has a total of three hundred-sixty (18×20=360) control or decision variables. The optimization method used herein can solve even larger problems, such as ones involving fifteen or more years[5].

TABLE 1

Average Performance (P) and Standard Deviation of the Performance ($\sigma_p$) when no Feedback is Used

| Uncertainty: Conductivity Measurement Standard Deviation | Performance Without Feedback |
| --- | --- |
| 5% | 44.5 (3.90) |
| 10% | 52.6 (11.9) |
| 25% | 88.0 (40.0) |

Also, the duration of time that is desirable to keep the pumping rates fixed can be adjusted to meet mechanical constraints[6]. The optimizations were constrained to consider only extraction wells.

Optimal Policies

Three optimal policies for the deterministic remediation problem (b 1)–(6) were calculated, based on three homogeneous conductivity fields with conductivities of 0.90, 1.00, and 1.10 times 4.31×10⁻⁴ m/s. The first field represents a 10% underestimation of the conductivity on average, or a −10% bias. The second field represents using the true average conductivity, or no bias. The third field represents a 10% overestimation of the conductivity on average, or a +10% bias. All three policies use only four of the 18 possible wells. Although fixed costs are not considered in the objective function, there were no low-flow or "trickle" wells selected by the optimization.

Policies With and Without Feedback

The deterministic optimal policy corresponding to no bias was applied without feedback to each of the 30 realizations with a 5%, 10%, and 25% standard deviation scatter. The average of the performance index and its standard deviation over each set of 30 aquifer realizations are presented in Table 1. All values for the performance index in Table 1, and all other tables, are calculated using the same set of weights, i.e., $w_j=\bar{w}_j$. Table 1 indicates that, as expected, the average performance of the deterministic nonfeedback policies is higher (worse) as the uncertainty increases.

Table 2 presents the average performance of two feedback laws modified by (17) and (18) and unmodified as a function of the magnitude of the uncertainty, and compares them to the performance when no feedback is used. In this case, the weighting parameters used by both the SALQR and DDP algorithms, $w_j$, are chosen to be the same as those which define the performance index: $w_j=\bar{w}_j$ (see (14)). Table 2 below presents the results when a bias of −10% is present in the conductivities used to generate the optimal policy.

In all cases in Table 2, modified feedback performed better than did no feedback; in two out of three cases, modified DDP feedback outperformed modified SALQR feedback. Based on the arguments presented earlier herein, it can be expected that DDP will, on average, outperform SALQR. Table 2 includes average performances for unmodified feedback, i.e., feedback defined by (13) without the modifications given by (17) and (18). The performance for unmodified feedback is often quite poor, due to violation of pumping constraints.

TABLE 2

Average Performance <P> and Standard Deviation of the Performance ($\sigma_p$) for Four Feedback Laws and When No Feedback is Used

| Uncertainty: Conductivity Measurement Standard Deviation | Performance Without Feedback | SALQR Feedback (Unmodified) | DDP Feedback (Unmodified) | SALQR Feedback (Modified) | DDP Feedback (Modified) |
| --- | --- | --- | --- | --- | --- |
| 5% | 48.2 (3.9) | 551. (293.) | 174. (157.) | 44.9 (2.8) | 45.3 (3.4) |
| 10% | 54.1 (11.2) | 792. (375.) | 306. (223.) | 48.6 (7.3) | 47.9 (5.5) |
| 25% | 88.6 (43.0) | 1104. (589.) | 612. (320.) | 73.3 (34.1) | 68.1 (29.2) |

All performance index values are calculated using the same set of weights, $\bar{w}_j$. Modified feedback incorporates (17) and (18). Bias is −10% for all cases.

In general, feedback laws (modified or unmodified) produced using either DDP or SALQR with arbitrary penalty function weighting can perform quite poorly However, it appears that this first logical choice ($w_j=\bar{w}_j$) is an improvement over using no feedback. Next, the weighting parameter space is searched to find better feedback laws. Hereinafter, when "feedback" is mentioned, the reference is to modified DDP and SALQR feedback, i.e., (17) and (18) are enforced.

Searching for Effective Feedback Laws by Changing Weightings

The weights $w_j$ used to derive feedback laws can be adjusted to find laws which perform well with respect to the performance index, (14), defined by the fixed weights $\bar{w}_j$. It is the fixed weights, $\overline{w}_j$, which measure the undesirability of constraint violation. By varying the penalty function weights $w_j$ and using either SALQR or DDP with the optimal policy, ten modified feedback laws were generated. For our example, the weighting space was searched by assigning a single weight to the control constraints, (4) and (5), and assigning a second single weight to the state constraints, (6). The two relative weights are denoted as $w_u$ for the control, or pumping, constraints and $w_c$ for the state, or drinking standard, constraints. Hence, the weight is $w_u\overline{w}_j$, if j is a pumping or control constraint, and $w_c\overline{w}_j$, if j is a concentration or state constraint. This procedure reduced the dimension of the weighting parameter space, $w_j$, to only two dimensions. Even with this simplification, there was a lot of freedom in designing the response of the feedback laws generated. For our example, ten feedback laws were generated with different values of $w_u$ and $w_c$ for each optimal policy (see Table 3 below).

TABLE 3

Definition of Modified Feedback Law Numbers

| No. | Description of Feedback Law |
| --- | --- |
| 1 | no feedback used (nonlinear programming) |
| 2 | SALQR with $[w_c, w_u] = [1.0, 1.0]$ |
| 3 | DDP with $[w_c, w_u] = [1.0, 1.0]$ |
| 4 | DDP with $[w_c, w_u] = [0.10, 1.0]$ |
| 5 | DDP with $[w_c, w_u] = [10.0, 1.0]$ |
| 6 | DDP with $[w_c, w_u] = [0.01, 0.1]$ |
| 7 | DDP with $[w_c, w_u] = [0.01, 1.0]$ |
| 8 | DDP with $[w_c, w_u] = [1.0, 0.05]$ |
| 9 | DDP with $[w_c, w_u] = [1.0, 0.10]$ |
| 10 | DDP with $[w_c, w_u] = [0.1, 0.10]$ |
| 11 | DDP with $[w_c, w_u] = [10.0, 0.1]$ |

The weighting values, $[w_c, w_u]$, are normalized with respect to the fixed weighting values $w_j$, used in the performance index.

Numerical Results for Different Weighting

The feedback laws 3 through 11 given in Table 3 were generated and tested in the order they are given. A subset of the 270-case combinations was used as an indicator of the quality of a particular law. Successive values of $(w_c, w_u)$ given in Table 3 were chosen based on the average performance (14), for each of the previously tested pairs, $(w_c, w_u)$.

Table 4 below indicates the average performance for the ten different feedback laws, each with different values of the weighting parameters $w_c$ and $w_u$, and also when no feedback is used. The performance is based on the optimal policy representing a modeled error of a+10% bias, applied to the thirty aquifers with a standard deviation of the error of 25%. For this example, all DDP laws outperform "no feedback" and SALQR. The last four laws (8 through 11) do much better than do other DDP laws; law 9 is the best.

TABLE 4

Modified Feedback Law Average Performance for 10% Positive Bias and a 25% Standard Deviation in Conductivity

| Law Number | Description of Law $[w_c, w_u]$ | Average Performance for $\sigma_k = 25\%, \mu_k = +10\%$ |
| --- | --- | --- |
| 1 | no feedback used | 118.9 (61.0) |
| 2 | SALQR [1.0, 1.0] | 139.2 (117.) |
| 3 | DDP [1.0, 1.0] | 89.50 (44.8) |
| 4 | DDP [0.1, 1.0] | 93.40 (40.5) |
| 5 | DDP [10.0, 1.0] | 90.76 (49.0) |
| 6 | DDP [0.01, 0.1] | 91.93 (46.1) |
| 7 | DDP [0.01, 1.0] | 92.03 (46.5) |
| 8 | DDP [1.0, 0.05] | 68.09 (30.5) |
| 9 | DDP [1.0, 0.1] | 58.93 (18.7) |
| 10 | DDP [0.1, 0.1] | 62.23 (23.1) |
| 11 | DDP [10.0, 0.1] | 63.42 (24.1) |

All average performance values were calculated using $\overline{w}_j$.

Figure 3:
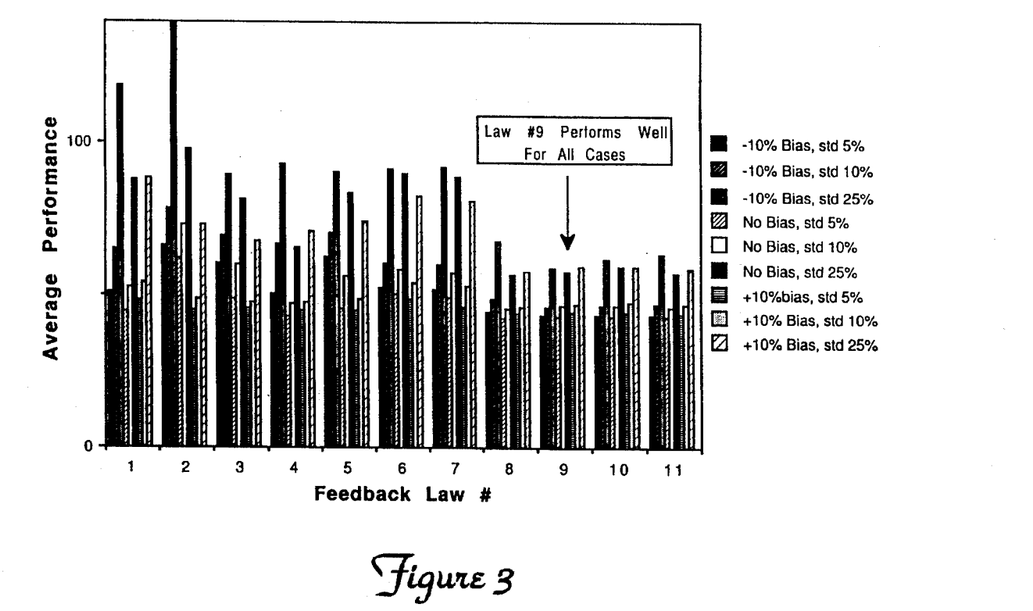
FIG. 3 shows a graph of average performance for eleven remediation policies (feedback laws) with respect to nine combinations of conductivity bias and standard deviation.

Referring to FIG. 3, the average performances over thirty aquifers are illustrated. All eleven policies are defined in Table 3 for each of the nine combinations of bias and standard deviation. FIG. 3 demonstrates how much laws 9 through 11 reduce the averages and variability, relative to the other feedback laws (2 through 8), and the case where no feedback is used (law 1).

It is evident from FIG. 3 that feedback law 9 outperformed the other laws overall. Also, law 9 outperformed other laws based on most of the individual combinations of bias and standard deviation, which demonstrates the robustness of feedback law 9. Most laws perform worse on the cases with 25% variance; law 9 does particularly well on these difficult cases.

Table 5 below summarizes the results of the nine different statistical conditions of the conductivity measurement error under three of the ten feedback laws, including law 9. Each value in a given row represents an average over the same set of thirty different aquifers generated randomly with the specified bias and standard deviation. The quantities in parentheses are the standard deviations of the performance index for the thirty aquifers.

TABLE 5

Average Performance <P> and Standard Deviation of the Performance ($\sigma_p$) for Three Feedback Laws and When No Feedback is Used

| Uncertainty: Conductivity Measurement | | Performance | | | DDP Best | Performance |
| --- | --- | --- | --- | --- | --- | --- |
| Bias | Standard Deviation | Without Feedback | SALQR Law 2 [1.0, 1.0] | DDP Law 3 [1.0, 1.0] | Law 9 [1.0, 0.1] | Index Decrease |
| +10% | 5% | 51. (6.5) | 66.0 (19.0) | 60.6 (21.0) | 43.2 (1.9) | 15.2% |
|  | 10% | 65.0 (17.0) | 78.6 (37.2) | 69.56 (20.6) | 45.8 (3.8) | 29.5% |
|  | 25% | 118.9 (61.0) | 139.2 (117) | 89.5 (48.5) | 58.9 (18.7) | 50.8% |

TABLE 5-continued

Average Performance <P> and Standard Deviation of the Performance ($\sigma_p$) for Three Feedback Laws and When No Feedback is Used

| Uncertainty: Conductivity Measurement | | Performance | | | DDP Best | Performance |
|---|---|---|---|---|---|---|
| Bias | Standard Deviation | Without Feedback | SALQR Law 2 [1.0, 1.0] | DDP Law 3 [1.0, 1.0] | Law 9 [1.0, 0.1] | Index Decrease |
| No Bias | 5% | 44.5 (3.9) | 61.9 (16.0) | 48.6 (7.2) | 42.7 (2.2) | 4.0% |
| | 10% | 52.6 (11.9) | 73.3 (26.9) | 59.8 (17.0) | 46.4 (4.9) | 11.7% |
| | 25% | 88.0 (40.0) | 98.0 (50.0) | 81.9 (36.3) | 57.7 (12.9) | 34.4% |
| −10% | 5% | 48.2 (3.9) | 44.9 (2.8) | 45.3 (3.4) | 44.3 (2.7) | 8.1% |
| | 10% | 54.1 (11.2) | 48.6 (7.3) | 47.9 (5.5) | 47.2 (4.5) | 12.7% |
| | 25% | 88.6 (43.0) | 73.3 (34.1) | 68.1 (29.2) | 59.3 (17.5) | 33.3% |

All performance index values are calculated using the same set of weights, $\overline{w}_j$. The values in brackets are the penalty function weightings associated with a feedback law [$w_c$, $w_u$]. The performance index decrease column is the percent decrease achieved in the index, using the best feedback law over the performance without using feedback.

Table 5 indicates that law 9 is remarkably robust: it outperforms the "no feedback" policy under each of the wide range of uncertainty conditions. Further, law 9 achieves the greatest reduction in the performance index over the "no feedback" policy when there is a large, undetected spatial variability and nonzero bias. Laws 2 and 3 are representative of the performance of poorly tuned feedback laws: laws which do not have well-chosen weights. In particular, feedback can perform worse than no feedback with certain weight choices.

Table 6 below compares the actual concentration standard violation, constraint (6), of feedback law 9 to the case where no feedback is used. The results are averages over thirty aquifers representing the application of a policy and feedback with a bias of − 10% and a standard deviation of 25%. This bias and standard deviation combination is one of the most difficult to manage for all the laws considered (FIG. 3). Individual observation well maximum violations resulting from feedback are an order of magnitude smaller than that with no feedback. Furthermore, the fraction of observation wells at which there are violations of the concentration constraint is reduced by a factor of 3, when feedback law 9 is used. These results, along with the performance values given in Table 5, indicate how well feedback can perform under uncertainty.

TABLE 6

Comparison of Concentration Constraint Violations for Law 9 and When No Feedback is Used

| Statistic | Without Feedback | Feedback Law 9 |
|---|---|---|
| Average maximum violation, μg/L | 0.390 | 0.033 |
| Average number of violations at 13 observation wells | 3.5 | 1.2 |
| Average maximum violation as a percentage of the water quality standard, % | 78 | 6.6 |
| Average violation at violating wells, μg/L | 0.260 | 0.038 |

Values given are averages over 30 aquifers representing the application of a policy and feedback with a bias of −10% and standard deviation scatter of 25%. Each aquifer simulated has 13 observation wells at which the concentration of contaminant must be less than 0.5005 μg/L to be considered nonviolating.

Other Performance Criteria and Computational Requirements

Figure 4:
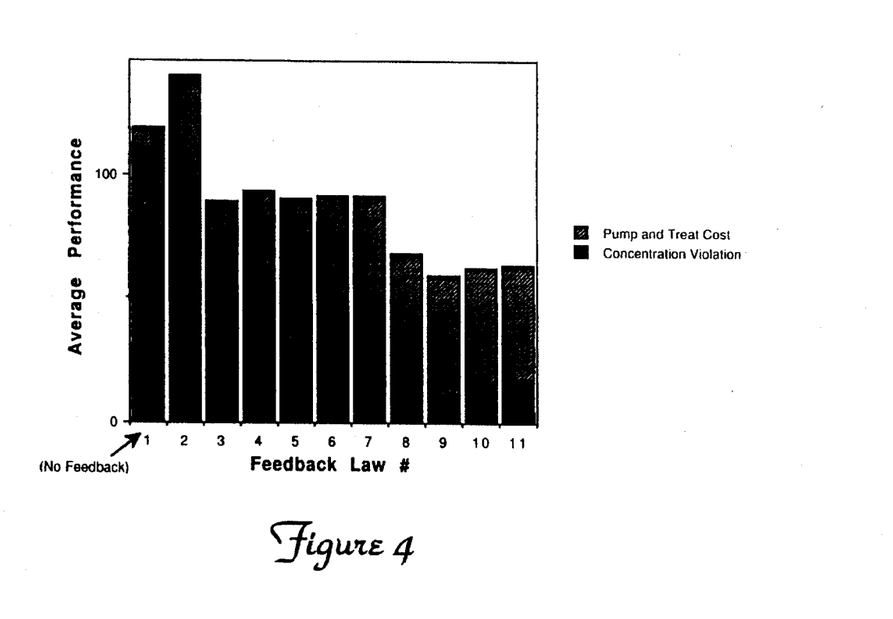
FIG. 4 illustrates a graph depicting performance of the eleven remediation policies shown in FIG. 3 (for the 10% bias, 25% standard deviation case).

FIG. 4 is a graph of further criteria or different performance indices that can be used to distinguish between the feedback laws tested. In particular, FIG. 4 illustrates a decomposition of the performance index (14) into its two components. The first component is the operational cost, $$\sum_{t=1}^{N} g^t(x_t, u_t),$$

and the second is the penalty for constraint violation or recourse, $$\sum_{t=1}^{N} \sum_{j \in \{r_1\}} Y_j^t(x_t, u_t, \overline{w}_j).$$

A comparison is made of the ten feedback laws for the case when there is a +10% bias and a 25% standard deviation scatter. The performance index chosen does not strongly distinguish between laws 9 and 10. However, it is clear from the decomposition of the index shown in FIG. 4 that law 9 typically pumps more than law 10; also law 9 correspondingly violates the concentration constraints by a lesser amount than does law 10 on average. Further site criteria, such as risk aversion, distinguish these two laws Law 9 will, in the average sense, have higher operating costs; however, it will be more likely to satisfy the contamination tolerances at the end of the planning horizon. This difference between laws 9 and 10 is predictable, considering the constraint weightings used to generate the laws. Law 9 has the weights ($w_c$, $w_u$)=(1.0, 0.1), which represents a higher weight on concentration violation, $w_c$, than the weights ($w_c$, $w_u$)=(0.1, 0.1) associated with law 10. This is a simple example of the flexibility available in the design of feedback laws based on the penalty function method.

The computational requirement for generating and testing feedback laws for problems of the size of our example is not demanding, once a deterministic optimal policy $\overline{u}_t$ is known. In particular, 90 seconds of CPU on an IBM 3090J are required to calculate α and β, using the full second-derivative formulation of DDP for our example. The solution of the original optimal control problem can be computationally expensive; the numerical example shown here requires 45 minutes of IBM 3090J CPU time[6]. For conversion of CPU time to other machines, the calculation rate was estimated to be 60 million floating point operations per second (MFLOPS). Thus, a workstation operating at 15 MFLOPS will require approximately 6 minutes to calculate a feedback law. Finite element simulations using feedback can be performed easily on a personal computer. Since the typical cost of remediation projects can be on the order of millions of dollars, even a large computational budget will be well worth the operation cost savings achieved.

The invention suggests that a new, or "secondary", optimization problem can be defined to minimize a function of the performance index over the weighting parameter space, in order to produce a "best" feedback law. This secondary optimization can be used in place of a systematic search of the weighting parameter space. A formulation of the feedback law optimization problem could be, for example, $\min_{\text{weighting space } w_j}(P)$, where (P) is the average value of the performance index over some established set of randomly errored flow and transport model parameter sets, and P is calculated according to (14) with $\overline{w}_j$ fixed.

For the numerical example presented in this invention, well-designed, weighted DDP feedback outperformed pumping policies with no feedback under every type of modeled error The results indicate that the use of a weighted, constrained DDP feedback law with an optimal policy is preferable to using an optimal policy without feedback, which may be generated with nonlinear programming NLP, since (NLP) does not generate any form of a feedback law. Further, using the full, second-order algorithm, DDP generated superior feedback laws when compared with those generated by the SALQR algorithm (which neglects second derivatives of the transition function). Thus, the second derivatives of the transition function should be included, when calculating feedback laws.

A significant advantage to using the method of the invention, is that the results of the average and standard deviation of cost-related performance indices under feedback can be used to estimate the cost bounds expected for a remediation under uncertainty. This will allow remediation planners to generate cost estimates with confidence measures, thus reducing the likelihood of cost overruns due to modeling errors.

The numerical results of this invention indicate that feedback laws can be generated that are highly robust, with respect to the type and size of the model error and uncertainty, and yet remain highly efficient for most specific applications. For the numerical example, it was found that feedback law 9 performed well for all nine error conditions. Hence, if any subset of the set of erroneous conductivity fields was used, law 9 was still the best law. This suggests that the selection of the best feedback law is not very sensitive to pre-assumed (and artificial) form for a distribution of model error. This is in contrast to many methods related to stochastic, linear or dynamic programming, which require this choice and can be highly sensitive to the assumed distributions of the uncertain parameters.

Methods which incorporate uncertainty by modeling error with specified distributions may become very complex, when multiple sources of error are considered. For instance, consider error due to initial conditions, boundary conditions, adsorbtivity, recharge rates and dispersivity, as well as conductivity. Feedback will respond to all of these sources of error without added complexity. Testing and selecting feedback laws for other sources or multiple sources of error is no more complex.

APPENDIX A

DIFFERENTIAL DYNAMIC PROGRAMMING

The following is an outline of the differential dynamic programming (DDP) algorithm and the sequential approximation linear quadratic regulator algorithm (SALQR) used to solve the unconstrained optimal control problem with penalty functions, equations (7)–(9), and also used to generate feedback laws. Both algorithms are identical except where specifically indicated below. For an in-depth derivation of the DDP method, see the article cited as No. 23 in the appended REFERENCES.

Step 1. Find an initial guess (nominal) policy for the starting point of the iterative process to find the optimal policy Denote this policy $\overline{u}$. Find the nominal state trajectory using the transition function, $\overline{x}_{t+1}=T^t(\overline{x}_t, \overline{u}_t)$. Calculate the loss associated with the nominal policy, $\Sigma_t^N=1$ $[g^t(\overline{x}_t, \overline{u}_t)+Y_*^t(\overline{x}_t, \overline{u}_t, w_j)]$. (See Table 7 below for notations and definitions.)

Step 2. Set the parameters $P_{N+1}=0_{(n \times n)}$, $Q_{N+1}=0_{(n \times 1)}$ and $\Theta_{N+1}=0$. Begin with time t=N and calculate the following values:

$$A_t = \frac{1}{2}\left[ g_{xx}^t + Y_{*,xx}^t + 2(T_x^t)^\dagger P_{t+1} T_x^t + \sum_{i=1}^{n} Q_i^{t+1} T_{i,xx}^t \right] \quad (19)$$

$$B_t^\dagger = g_{xu}^t + Y_{x,xu}^t + 2(T_x^t)^\dagger P_{t+1} T_u^t + \sum_{i=1}^{n} Q_i^{t+1} T_{i,xu}^t \quad (20)$$

$$C_t = \frac{1}{2}\left[ g_{uu}^t + Y_{*,uu}^t + 2(T_u^t)^\dagger P_{t+1} T_u^t + \sum_{i=1}^{n} Q_i^{t+1} T_{i,uu}^t \right] \quad (21)$$

$$D_t = g_u^t + Y^{t*,u} + [T_u^t]^\dagger Q_{t+1} \quad (22)$$

$$E_t = g_x^t + Y^{t*,x} + [T_x^t]^\dagger Q_{t+1}. \quad (23)$$

The superscript dagger ($\dagger$) indicates the transpose. The difference between the DDP and the SALQR algorithms is that the SALQR algorithm assumes the Hessian of T, $T^t_{i,xx}$, $T^t_{i,xu}$, and $T_{ti,uu}$, is zero, when calculating the matrices $A_t$, $B_t$ and $C_t$, in (19)–(21). Once the matrices A, B and C and the vectors D and E are evaluated, then calculate and store the following values:

$$P_t = A_t - \frac{1}{4} B_t^\dagger C_t^{-1} B_t \quad (24)$$

$$Q_t = \frac{1}{2}B_t^\dagger [C_t^{-1}]^\dagger D_t + E_t. \quad (25)$$

Next, calculate and store the feedback law for time step t according to:

$$\alpha_t = -\frac{1}{2}C_t^{-1}D_t \quad (26)$$

$$\beta_t = -\frac{1}{2}C_t^{-1}B_t \quad (27)$$

Finally, calculate and store in place of $\Theta_{t+1}$ $$\Theta_t = -\frac{1}{2}D_t^\dagger C_t^{-1} D_t + \Theta_{t+1}. \quad (28)$$

If t>1, then let t=t−1, and repeat the calculations of (19)–(28).

Step 3. Compute the new policy using the feedback law and the nominal policy, $\overline{u}$. Set $\epsilon=1$, and then for t=1, 2, 3, ..., N−1 compute:

$$u_t = \overline{u}_t + \epsilon\alpha_t + \beta_t(x_t - \overline{x}_t) \quad (29)$$

$$x_{t+1}=T^t(x_t, u_t) \quad (30)$$

subject to:

$$x_{t=1}=x_0. \quad (31)$$

Step 4. Compute the new loss associated with the new control u and subtract this loss from the loss associated with the nominal policy $\bar{u}$:

$$\Delta = \sum_{t=1}^{N} [g^t(x_t, u_t) + Y_*^t(x_t, u_t) - g^t(\bar{x}_t, \bar{u}_t) - Y_*^t(\bar{x}_t, \bar{u}_t)] \quad (32)$$

If $\Delta$ is less than $\notin \Theta/2$, then let $\bar{u}=u$ and go to Step 1; otherwise, let $\notin = \notin /2$ and repeat Step 3. Convergence to a minimum is signaled when $0$, which is related to the gradients of g, Y and T, becomes very small.

It is noted that for this method to find reasonable descent directions, the matrices $C_t$ must be positive definite, and will require an additional technique, such as shifting[13], whenever $\bar{u}$ is far from optimal and the DDP method is used.

TABLE 7

Notation Used in the DDP Algorithm

| Variable | Definition |
| --- | --- |
| $g^t$ | cost incurred during decision period $t \in [1, N]$ |
| $g_x^t, g_u^t$ | first derivatives of the cost function with respect to the state and control variables, $x_t$ and $u_t$ |
| $g_{xx}^t, g_{xu}^t, g_{uu}^t$ | blocks of the Hessian of the cost function |
| $T_i^t$ | the ith component of the transition function, $x_{t+1} = T(x_t, u_t, t)$ |
| $T_x^t, T_u^t$ | Jacobians of the transition function |
| $T_{i,xx}^t, T_{ixu}^t, T_{i,uu}^t$ | blocks of the Hessian of T: $\partial^2 T_i / \partial x \partial x$, etc. |
| $Y_*^t$ | sum of all penalties incurred for decision period t which is $\Sigma_{j \in \{r_t\}} Y_j(x_t, u_t, w_j)$ where $\{r_t\}$ is the set of constraints to be enforced at time t |
| $Y_{*,x}^t, Y_{*,u}^t$ | first derivatives of the penalty sum with respect to the state and control variables, $x_t$ and $u_t$ |
| $Y_{*,xx}^t, Y_{*,xu}^t, Y_{*,uu}^t$ | blocks of the Hessian of the penalty sum |
| N | number of time steps or constant control periods |
| n | state dimension |
| m | control dimension |

APPENDIX B

FLOW AND TRANSPORT MODEL

A two-dimensional implicit time Galerkin finite element model is used to model the example groundwater system. The transient flow equation for a two-dimensional confined aquifer with storage, but without leakage, can be expressed as (see Table 8 below for notations)

$$\nabla \cdot (bK\nabla h) + \sum_{i \in Q} \bar{q_i}\delta(x_i, y_i) - bS_s \frac{\partial \bar{h}}{\partial t} = 0. \quad (33)$$

The following boundary and initial conditions are used to yield unique solutions to (33):

$$\nabla_\perp \bar{h} = \beta_h(\bar{h}-h_b) + \gamma_h|_{(all\ points\ on\ the\ boundary)} \quad (34)$$

$$\bar{h}(x, y, t=0) = h_0(x, y), \quad (35)$$

where: $\beta_h$ and $\gamma_h$ are given consistent functions on the boundary. Containment transport with a linear adsorption isotherm was used for the simulation model. The form of the transport equation is $$\nabla \cdot (\theta b \bar{D} \cdot \nabla c) - bv \cdot \nabla c - b\left(\theta + \rho_B \frac{\partial S}{\partial c}\right)\frac{\partial c}{\partial t} = 0 \quad (36)$$

subject to the following boundary and initial conditions:

$$\nabla_\perp c = \beta_c(c-C_b) + \gamma_c|_{(all\ points\ on\ the\ boundary)} \quad (37)$$

$$c(x, y, t=0) = c_0(x, y), \quad (38)$$

where: $\beta_c$ and $\beta_c$ are given consistent functions on the boundary.

The linear adsorption isotherm is of the form:

$$\frac{\partial S}{\partial c} = k. \quad (39)$$

The following dispersion velocity relationships were assumed in the finite element model:

$$\bar{D}_{xx} = (\alpha_L v_x^2 + \alpha_T v_y^2)/|v| + D_M \tau \quad (40)$$

$$\bar{D}_{yy} = (\alpha_L v_y^2 + \alpha_T v_x^2)/|v| + D_M \tau \quad (41)$$

$$\bar{D}_{xy} = \bar{D}_{yx} = (\alpha_L - \alpha_T)v_x v_y/|v| \quad (42)$$

where: $\alpha_L$ is the longitudinal dispersivity, $\alpha_t$ is the transverse dispersivity, $D_M$ is the molecular diffusion coefficient, and $\tau$ is tortuosity. A detailed description of the Galerkin finite element method used to solve the transport and flow equations can be found in the articles cited as Nos. 17 and 18 in the appended REFERENCES. Table 9 below presents the model parameters used in the simulations; these are the same as used in the prior Cornell University method[5].

TABLE 8

Flow and Transport Model Variables

| Variable | Definition |
| --- | --- |
| b | saturated vertical thickness of the aquifer (L) |
| c | contaminant concentration (M/L$^3$) |
| $c_b$ | concentration boundary value (M/L$^3$) |
| $c_0(x, y)$ | initial concentration (M/L$^3$) |
| $\bar{D}$ | hydrodynamic dispersion tensor (L$^3$/T) |
| $\delta(x_i, y_i)$ | two-dimensional Dirac delta function centered at $x_i, y_i$ |
| $\Delta_\perp c$ | directional derivative of c normal to the boundary (M/L$^4$) |
| $\Delta_\perp \bar{h}$ | directional derivative of $\bar{h}$ normal to the boundary (L/L) |
| $\bar{h}$ | vertically averaged hydraulic head (L) |
| $h_b$ | head boundary value (L) |
| $h_0(x, y)$ | initial head field (L) |
| k | equilibrium constant for linear isotherm (L$^3$/M) |
| $\underline{K}$ | hydraulic conductivity tensor (L/T) |
| $\overline{q_i}$ | pumping rate for well i located at $(x_i, y_i)$ (L$^3$/T) |
| $\rho_B$ | bulk density of the porous medium (M/L$^3$) |
| S | mass of adsorbed pollutant per unit mass of porous medium |
| $S_s$ | specific storage (L$^{-1}$) |
| $\theta$ | porosity |
| v | Darcy velocity defined as $v = -K \cdot \Delta \bar{h}$ (L/T) |

TABLE 9

Flow and Transport Model Parameter Values

| Parameter | Value |
|---|---|
| Aquifer thickness (b) | 10 m |
| Porosity ($\theta$) | 0.2 |
| Specific storage ($S_s$) | 0.001 |
| Retardation coefficient (R = $\theta$ + $\rho_B(\partial S/\partial c)$) | 0.72 |
| Molecular diffusion ($D_M\tau$) | 0.0000001 m²/S |
| Longitudinal dispersivity ($\alpha_L$) | 70 m |
| Transverse dispersivity ($\alpha_T$) | 3 m |
| Isotherm equilibrium constant (k) | 0.52 L/µg |
| Modeled area | 900 × 1500 m² |
| Element size | 150 × 150 m² |
| Time step size ($\Delta t$) | 2190 hours |
| Number of time steps (N) | 20 |
| Planing time (N $\Delta t$) | 5 years |

REFERENCES

1. Ahlfeld, D. P., and Z. Hyder, A survey and statistical analysis of contaminant transport characteristics of Connecticut's stratified drift aquifers, Rep. ERI 90-5, Environ. Res. Inst., Univ. of Conn., Storrs, 1990.
2. Ahlfeld, D. P., J. M. Mulvey, G. F. Pinder, and E. F. Wood, Contaminated groundwater remediation design using simulation, optimization, and sensitivity theory, 1, Model development, *Water Resour. Res.*, 24(3), 431–441, 1988a.
3. Ahlfeld, D. P., J. M. Mulvey, G. F. Pinder, and E. F. Wood, Contaminated groundwater remediation design using simulation, optimization, and sensitivity theory, 2, Analysis of a field site, *Water Resour. Res.*, 24(3), 443–452, 1988b.
4. Andricevic, R., and P. K. Kitanidis, Optimization of the pumping schedule in aquifer remediation under uncertainty, *Water Resour. Res.*, 26(5), 875–885, 1990.
5. Chang, L.-C., C. A. Shoemaker, and P. L.-F. Liu, Application of a constrained optimal control algorithm to groundwater remediation, *Water Resour. Res.*, 28(12), 3157–3173, 1992.
6. Culver, T., and C. A. Shoemaker, Dynamic optimal control for groundwater remediation with flexible management periods, *Water Resour. Res.*, 28(3), 6290641, 1992.
7. Culver, T., and C. A. Shoemaker, Optimal control for groundwater remediation by differential dynamic programming with quasi-Newton approximations, *Water Resour. Res.*, 29(4), 823–831, 1993.
8. Dougherty, D. E., and R. A. Marryott, Optimal groundwater management, 1, Simulated annealing, *Water Resour. Res.*, 27(10), 2493–2508, 1991.
9. El-Kadi, A. I., A computer program for generating two-dimensional fields of autocorrelated parameters, *Groundwater*, 24(5), 663–667, 1986.
10. Gorelick, S. M., C. I. Voss, P. E. Grill, W. Murray, M. A. Saunders, and M. H. Wright, Aquifer reclamation design: The use of contaminant transport simulation combined with nonlinear programming, *Water Resour. Res.*, 20(4), 415–427, 1984.
11. Jacobson, D. H., and D. Q. Mayne, *Differential Dynamic Programming*, Elsevier Science, New York, 1970.
12. Lee, S. I., and P. K. Kitanidis, Optimal estimation and scheduling in aquifer remediation with incomplete information, *Water Resour. Res.*, 27(9), 2203–2217, 1991.
13. Liao, L.Z., and C. A. Shoemaker, Convergence in unconstrained discrete-time differential dynamic programming, *IEEE Trans. Autom. Control*, 36(6), 692–706, 1991.
14. Mayne, D., A second-order gradient method for determining optimal trajectories of non-linear discrete-time systems, *Int. J. Control*, 3(1), 85–95, 1966.
15. Mejia, J. M., and I. Rodriguez-Iturbe, On the synthesis of random field sampling from the spectrum: An application to the generation of hydrologic spatial processes, *Water Resour. Res.*, 10(4), 705–711, 1974.
16. Patrick, R., E. Ford, and J. Quarles, *Groundwater Contamination in the United States*, 2nd ed., University of Pennsylvania Press, Philadelphia, 1987.
17. Pinder, G. F., and E. O. Frind, Application of Galerkin's procedure to aquifer analysis, *Water Resour. Res.*, 8(1), 108–120, 1972.
18. Pinder, G. F., and W. G. Gray, *Finite Element Simulation in Surface and Subsurface Hydrology*, Academic, San Diego, Calif., 1977.
19. Ranjithan, S., and J. W. Eheart, Neural network-based screening for groundwater reclamation under uncertainty, *Water Resour. Res.*, 29(3), 563–574, 1993.
20. Ranjithan, S., J. W. Eheart, and J. H. Garrett, Jr., Application of neural network in groundwater remediation under conditions of uncertainty, paper presented at International Workshop on New Uncertainty Concepts in Hydrology and Water Resources, Int. Assoc. of Hydrol. Sci., Madralin, Poland, Sept. 24–26, 1990.
21. Wagner, B. J., and S. M. Gorelick, Optimal groundwater quality management under parameter uncertainty, *Water Resour. Res.*, 23(7), 1162–1174, 1987.
22. Wagner, J. M., U. Shamir, and H. R. Nemati, Groundwater quality management under uncertainty: Stochastic programming approaches and the value of information, *Water Resour. Res.*, 28(5), 1233–1246, 1992.
23. Yakowitz, S., and B. Rutherford, Computational aspects of discrete-time optimal control, *Appl. Math. Comput.*, 15, 29–45, 1984.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of groundwater remediation utilizing differential dynamic programming (DDP) with feedback, comprising the steps of:
   a) establishing a remediation groundwater pumping policy;
   b) setting parameters for the remediation groundwater pumping policy established in step (a);
   c) computing said remediation groundwater pumping policy using a feedback law;
   d) applying said remediation groundwater pumping policy to groundwater at a groundwater site to be remediated; and
   e) remediating said groundwater at said groundwater site.

2. The method of groundwater remediation in accordance with claim 1, wherein the remediation groundwater pumping policy of steps (a) through (c) comprises a time-varying pumping policy.

3. The method of groundwater remediation in accordance with claim 1, wherein said groundwater site of steps (d) and (e) is characterized by uncertainty in aquifer parameters (such as hydraulic conductivity) or uncertainty in initial concentrations of contaminant concentration.

4. The method of groundwater remediation in accordance with claim 1, wherein said dynamic differential programming utilizes a numerical model (such as a two-dimensional Galerkin finite element scheme with implicit time differencing) in performing the computing step (c).

5. The method of groundwater remediation in accordance with claim 1, further characterized as a pump-and-treat method.

6. The method of groundwater remediation in accordance with claim 5, further comprising the steps of:

a) determining a pollution distribution and flow characteristics of said groundwater site;

b) choosing well locations for groundwater withdrawal, in accordance with said differential dynamic programming remediation policy with feedback; and c) withdrawing contaminated water from said groundwater site in accordance with said differential dynamic programming remediation policy with feedback, until adsorbed and dissolved pollutant concentrations reach some pre-assigned, safe level.

7. The method of groundwater remediation in accordance with claim 6, further comprising the steps of:

d) while withdrawing said contaminated water, treating said withdrawn contaminated water; and discharging said treated water of step (d) to surface water or groundwater.

8. A method of groundwater remediation utilizing dynamic differential programming (DDP) with feedback, comprising the steps of:

a) determining a pollution distribution and flow characteristics of a groundwater site requiring remediation;

b) choosing well locations at said groundwater site, for groundwater withdrawal in accordance with a differential dynamic programming remediation policy with feedback; and c) withdrawing contaminated water from said groundwater site in accordance with said differential dynamic programming remediation policy with feedback, until adsorbed and dissolved pollutant concentrations reach some pre-assigned, safe level.

9. The method of groundwater remediation utilizing differential dynamic programming (DDP) with feedback in accordance with claim 8, further comprising the steps of:

d) while withdrawing said contaminated water, treating said withdrawn contaminated water; and e) discharging said treated water of step (d) to surface water.

10. The method of groundwater remediation in accordance with claim 8, wherein the remediation groundwater policy of step (c) comprises a time-varying pumping policy.

11. The method of groundwater remediation in accordance with claim 8, wherein said groundwater site of steps (b) and (c) is characterized by uncertainty in aquifer parameters (such as hydraulic conductivity) or uncertainty in initial contaminant concentrations.

12. The method of groundwater remediation in accordance with claim 8, wherein said differential dynamic programming utilizes a numerical model (such as a two dimensional Galerkin finite element scheme with implicit time differencing) for solving partial differential equations in performing step (c).

\* \* \* \* \*